(12) United States Patent
Richardson et al.

(10) Patent No.: US 11,296,419 B1
(45) Date of Patent: Apr. 5, 2022

(54) REMOTE RECESSED REFLECTOR ANTENNA AND USE THEREOF FOR SENSING WEAR

(71) Applicant: REI, Inc., Salt Lake City, UT (US)

(72) Inventors: Randy Richardson, South Jordan, UT (US); Robert Koontz, Herriman, UT (US); Daniel J. Brunner, Salt Lake City, UT (US); Alex Schumacher, Salt Lake City, UT (US); Jeffrey J. Schwoebel, Park City, UT (US)

(73) Assignee: REI, Inc., Salt Lake City, UT (US)

( * ) Notice: Subject to any disclaimer, the term of this patent is extended or adjusted under 35 U.S.C. 154(b) by 394 days.

(21) Appl. No.: 15/496,747

(22) Filed: Apr. 25, 2017

Related U.S. Application Data

(60) Provisional application No. 62/450,298, filed on Jan. 25, 2017, provisional application No. 62/348,074, filed on Jun. 9, 2016, provisional application No. 62/329,832, filed on Apr. 29, 2016.

(51) Int. Cl.

| | |
|---|---|
| *H01Q 13/18* | (2006.01) |
| *E02F 9/26* | (2006.01) |
| *H01Q 15/14* | (2006.01) |
| *H01Q 1/42* | (2006.01) |
| *H04B 7/145* | (2006.01) |
| *H01Q 9/04* | (2006.01) |
| *G08C 17/02* | (2006.01) |
| *G01N 27/20* | (2006.01) |

(52) U.S. Cl.
CPC ............. *H01Q 13/18* (2013.01); *E02F 9/267* (2013.01); *G01N 27/20* (2013.01); *G08C 17/02* (2013.01); *H01Q 1/427* (2013.01); *H01Q 9/0407* (2013.01); *H01Q 15/147* (2013.01); *H04B 7/145* (2013.01)

(58) Field of Classification Search
CPC ........ H01Q 13/02; H01Q 13/18; H01Q 1/427; H01Q 9/0407; H01Q 15/147; E02F 9/26; E02F 9/27; G01N 27/20; G08C 17/02; H04B 7/145
See application file for complete search history.

(56) References Cited

U.S. PATENT DOCUMENTS

| | | |
|---|---|---|
| 3,518,609 A | 6/1970 | Fontenot, Jr. |
| 4,126,848 A | 11/1978 | Denison |
| 4,483,393 A | 11/1984 | More et al. |
| (Continued) | | |

FOREIGN PATENT DOCUMENTS

| | | |
|---|---|---|
| SU | 620577 A1 | 8/1978 |
| WO | WO-95/22679 A1 | 8/1995 |
| WO | WO-98/23849 A1 | 6/1998 |

OTHER PUBLICATIONS

Copenheaver, Blaine R., "International Search Report" prepared for PCT/US2013/031982 dated May 31, 2013, 3 pages.

*Primary Examiner* — Robert Karacsony
(74) *Attorney, Agent, or Firm* — Shackelford, Bowen, Mckinley & Norton, LLP

(57) ABSTRACT

A recessed antenna that includes a recessed plane formed in a conductive surface. An antenna is disposed on the recessed plane. A cavity is formed beneath the recessed plane. A circuit board is disposed in the cavity. The circuit board is electrically coupled to the antenna. A cover is disposed over the antenna, the cover protecting the antenna from abrasion.

10 Claims, 12 Drawing Sheets

(56) References Cited

U.S. PATENT DOCUMENTS

| | | | | |
|---|---|---|---|---|
| 4,511,842 A | * | 4/1985 | Moran | G01V 3/30 |
| | | | | 324/338 |
| 4,785,247 A | | 11/1988 | Meador et al. | |
| 4,921,438 A | | 5/1990 | Godfrey et al. | |
| 7,190,280 B2 | | 3/2007 | Hall et al. | |
| 7,207,396 B2 | | 4/2007 | Hall et al. | |
| 10,132,123 B2 | | 11/2018 | Johnson et al. | |
| 2004/0056816 A1 | * | 3/2004 | Bittar | H01Q 1/04 |
| | | | | 343/787 |
| 2004/0169367 A1 | | 9/2004 | Sutherland et al. | |
| 2004/0242044 A1 | | 12/2004 | Head | |
| 2006/0021799 A1 | | 2/2006 | Hall et al. | |
| 2006/0225926 A1 | | 10/2006 | Madhavan et al. | |
| 2007/0010119 A1 | | 1/2007 | Hall et al. | |
| 2008/0166917 A1 | | 7/2008 | Hall et al. | |
| 2011/0094729 A1 | | 4/2011 | Braden et al. | |
| 2013/0319768 A1 | | 12/2013 | Madhavan et al. | |

* cited by examiner

REMOTE RECESSED REFLECTOR ANTENNA AND USE THEREOF FOR SENSING WEAR

CROSS-REFERENCE TO RELATED APPLICATIONS

This application claims priority to, and incorporates by reference, each of U.S. Provisional Patent Application No. 62/329,832, U.S. Provisional Patent Application No. 62/348,074, and U.S. Provisional Patent Application No. 62/450,298.

BACKGROUND

Field of the Invention

The present invention relates generally to antennas and, more particularly, but not by way of limitation, to antennas secured in recessed surfaces. In one embodiment, the invention further relates to methods and systems for facilitating antenna placement enabling information transmission from conductive and non-conductive surfaces in such a way that surface topography is not affected. Such antenna arrangements are advantageous in monitoring wear of wear surfaces including but not limited to ground engagement tooling, firearms, handheld precision equipment, haul truck beds and bed liners, crusher liners, mill liners, shovel buckets and scoops, and heavy equipment track shoes

History of the Related Art

An antenna is an electrical device that converts electrical power into radio waves and vice versa. Typically, antennas are used with a radio transmitter or a radio receiver. In transmission, a radio transmitter supplies an electric current oscillating at radio frequency (i.e. a high frequency alternating current (AC)) to the antenna's terminals. The antenna radiates the energy from the current as electromagnetic waves (radio waves). In reception, an antenna intercepts some of the power of an electromagnetic wave in order to produce a voltage at its terminals, that is applied to a receiver to be amplified.

Antennas are essential components of all equipment that use radio and are used in systems such as, for example, radio broadcasting, broadcast television, two-way radio, communications receivers, radar, cellular phones, satellite communications, and the like. In addition, antennas are also used in devices such as, for example, wireless microphones, garage openers, RFID tags, Bluetooth enabled devices, and the like.

Typically, an antenna consists of an arrangement of metallic conductors electrically connected to a receiver or a transmitter. Such antennas are typically exposed from and/or extend outwardly of supporting structures. Such exposed antenna mountings/configurations do not lend themselves for use on "wear surfaces" where the antenna area could be impacted and/or abraded by external forces.

Addressing conventional antennas, an oscillating current of electrons forced through the antenna by a transmitter creates an oscillating magnetic field around the antenna elements, while the charge of the electrons also creates an oscillating electric field along the antenna elements. These time-varying fields radiate away from the antenna into space as a moving transverse electromagnetic field wave. Conversely, during reception, the oscillating electric and magnetic fields of an incoming radio wave exert force on the electrons in the antenna elements, causing them to move back and forth, creating oscillating currents in the antenna. For the antennas to effectively transmit signals, it is preferred to place the antennas on non-recessed surfaces.

SUMMARY

One embodiment of the present invention relates to a recessed antenna. The recessed antenna includes a recessed plane formed in a conductive surface. An antenna is disposed on the recessed plane. A cavity is formed beneath the recessed plane. A circuit board is disposed in the cavity. The circuit board is electrically coupled to the antenna. A cover is disposed over the antenna, the cover protecting the antenna from abrasion.

Another embodiment of the present invention relates to a wear monitor. The wear monitor includes a first resistor disposed proximate a wear surface. A second resistor is electrically coupled in parallel to the first resistor. A voltage source is electrically coupled to the first resistor and to the second resistor. A processing device is operatively coupled to the first resistor and to the second resistor. Progressive wear of the wear surface causes interruption of at least one of the first resistor and the second resistor. Upon interruption of at least one of the first resistor and the second resistor, a total resistance measured by the processing device changes.

Another embodiment of the present invention relates to a method of wear monitoring, the method. The method includes utilizing a tool having a wear monitor disposed therein. The wear monitor includes a circuit board having a plurality of resistor pairs disposed thereon. The method further includes monitoring, via a processing device, changes in at least one of voltage or resistance through the plurality of resistor pairs. Responsive to changes in at least one of voltage and resistance, a degree of wear of the tool is determined.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1:
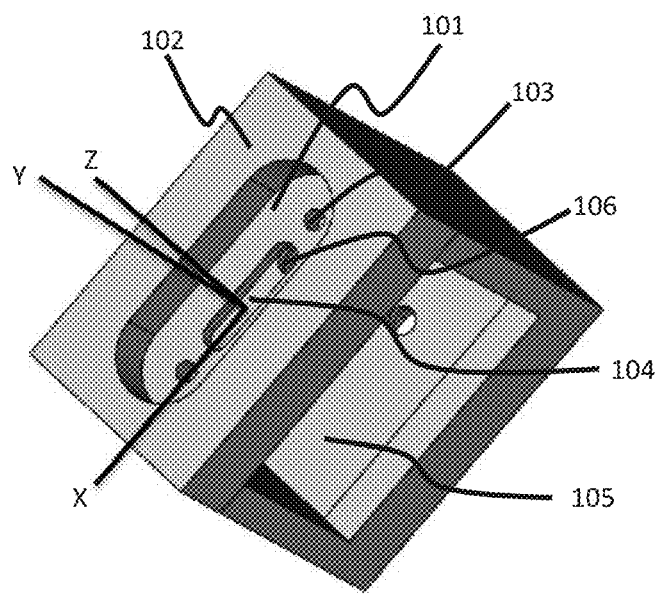
FIG. 1 is a perspective view of a steel module with a recess for an antenna and its X, Y and Z planes.

FIG. 1 illustrates a typical embodiment of a recess for a remote recessed reflector antenna. A recessed plane 101 is formed in a smooth or recessed surface 102 of a conductive material. Mounting holes 103 are formed in the recessed plane 101 for mounting of the antenna and a small circuit board. A wireline conduit 104 is formed in the recessed plane 101 for communication between the antenna and a printed circuit board (PCB) that is housed in a cavity 105 underneath the recessed plane 101 and which contains transducers and sensors or links to transducers and sensors, or other transmitted data. A hole 106 connects the wireline conduit 104 to the cavity 105. The cavity 105 dimensions are specific to the application may be altered, as dictated by design requirements. Recessing the antenna only slightly changes the radiation characteristics from an omnidirectional configuration that is characteristic of radiation reflected off conventionally mounted horn antennas. Transmission of data is accomplished by use of recessed antennas mounted in the desired transmission surface. The antenna may be encapsulated in the recess or otherwise covered in the recess with materials that will best withstand abrasion and the exposed environment. PTFE (Polytetrafluoroethylene, also known as Teflon) is an example of one material that may be well suited to this application because: it has low surface friction; it is rigid; and it does not significantly attenuate radio frequency transmissions. Small gaps around covers made of materials such as PTFE, may be sealed from moisture using epoxy or other suitable sealants. The size of the aperture used for wireless transmission must be minimized to best protect the antenna and associated circuits. One or more antennas may be implemented, based on the need to radiate and receive signals in multiple directions.

Figure 2:
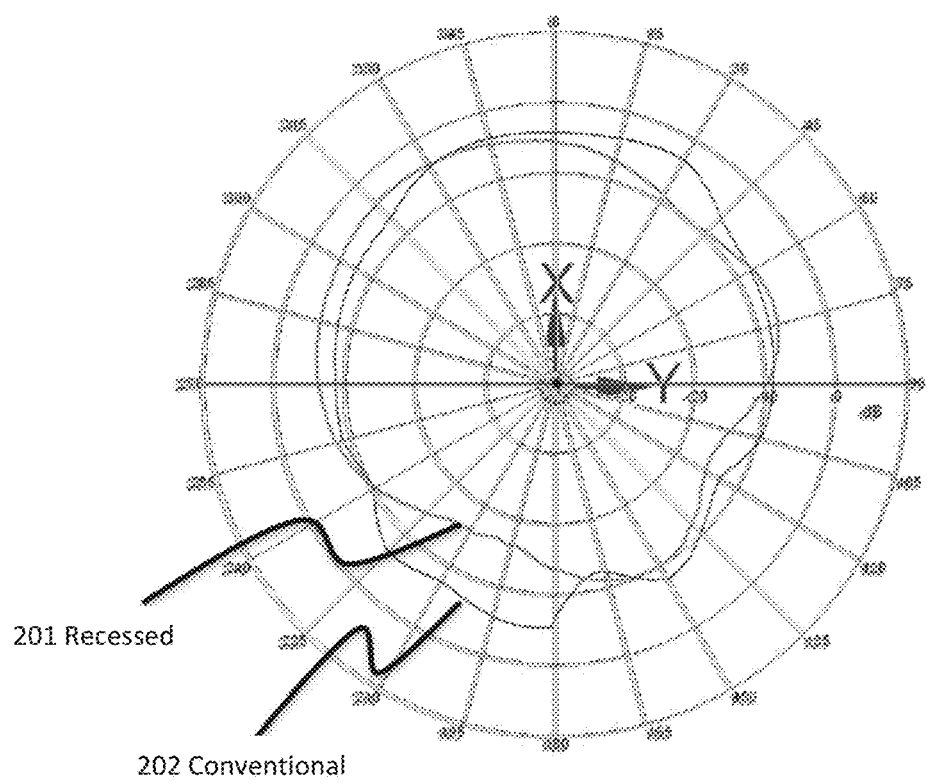
FIG. 2 is a plot of the test result of the radio frequency (RF) signal plume in the X-Y plane.
Figure 3:
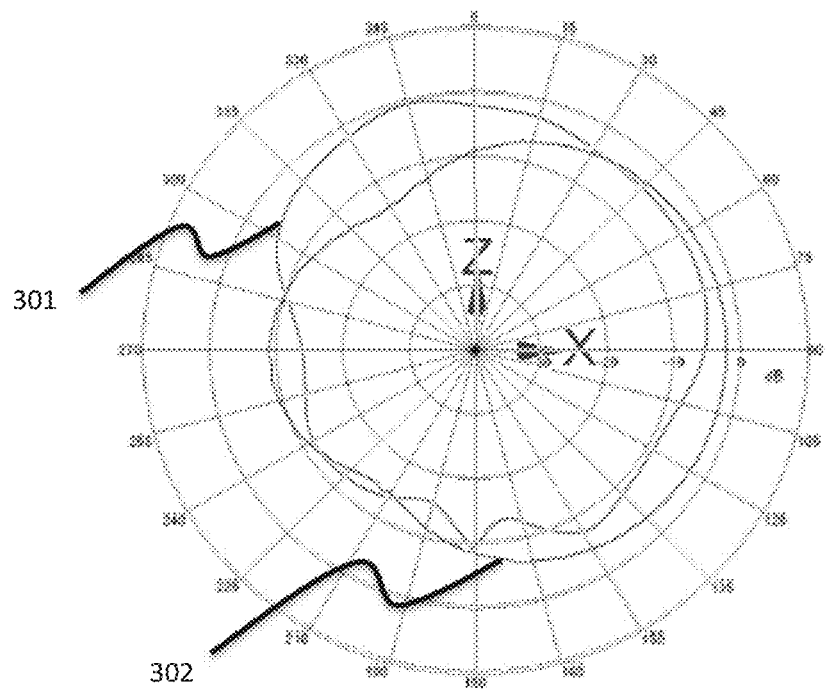
FIG. 3 is a plot of the test result of the radio frequency (RF) signal plume in the Z-X plane.
Figure 4:
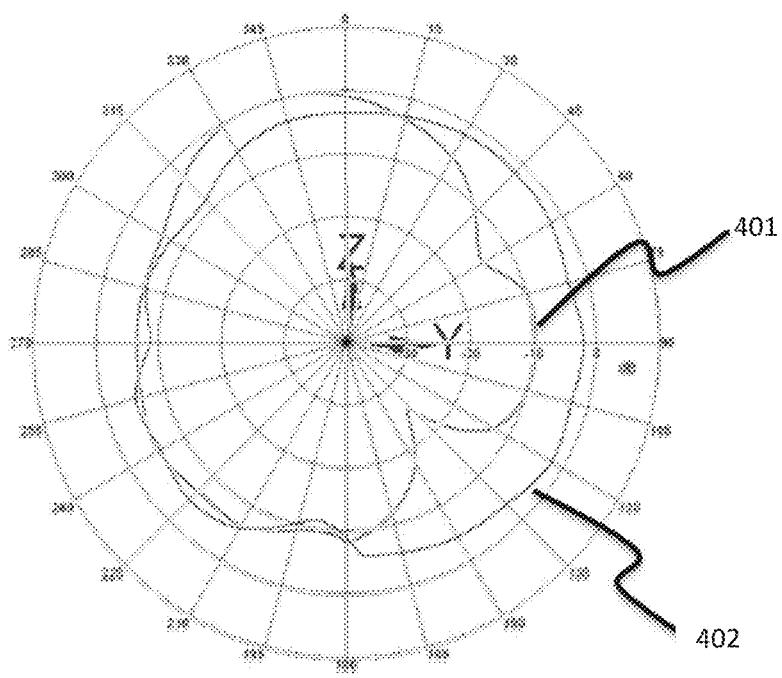
FIG. 4 is a plot of the test result of the radio frequency (RF) signal plume in the Z-Y plane.

It is widely believed that metallic objects may not protrude into the antenna pattern volume. Testing showed only a minor signal loss in the "straight out" direction with recessed vs non-recessed conventional antenna positioning. Surrounding radiation lobes were generally unaffected. Such a low signal loss is not expected and contradicts all design rules regarding installation of radio antennas. Typical design rules also indicate that the antenna must be mounted on the edge or corner of the PCB and that the equivalent minimum mounting area be 50 mm×30 mm. The FIGS. 2, 3, and 4 show the results of the RF transmission tests of a remote recessed reflector antennae with the recessed antenna represented in light gray 201 and the non-recessed (protruding) antenna in dark gray 202. The transmission plume and plume directions, X, Y, and Z reference the recess configuration and orientation illustrated in FIG. 1. In the X-Y Plane, FIG. 2, the light-colored line 201 illustrates the outline of the measured RF plume in the Z direction with the recessed antennae while the dark-colored line 202 represents the outline of the plume with the same antennae conventionally mounted. Similarly in the Z-X Plane, FIG. 3 shows the plume outline in the Y direction for the recessed antenna 301, and conventional antenna 302. Lastly, FIG. 4 illustrates the plume outline in the Z-Y Plane with the plume in the X direction for the recessed antenna 401, and conventional antenna 402. Overall, the recessed antennae measured comparable RF transmission in the Z direction, comparable to improved transmission in the Y direction, and slightly impaired transmission in the X direction. Overall degradation due to the recess design tested was measured at less than approximately 8 percent.

Figure 5A:
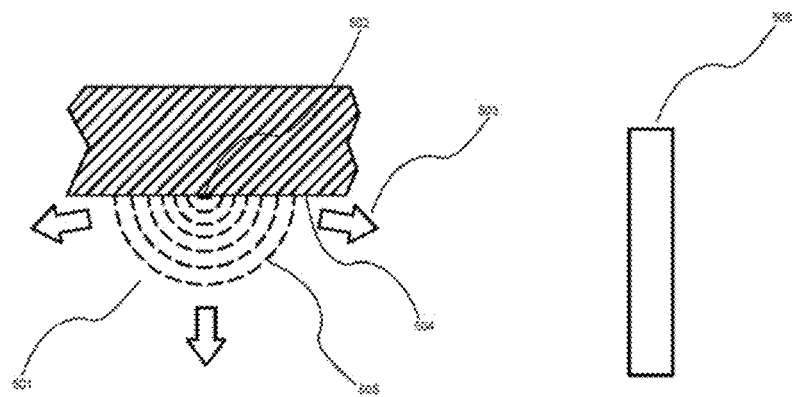
FIGS. 5A-5C are schematic diagrams illustrating antenna beam radiation patterns according to an exemplary embodiment.
Figure 5B:
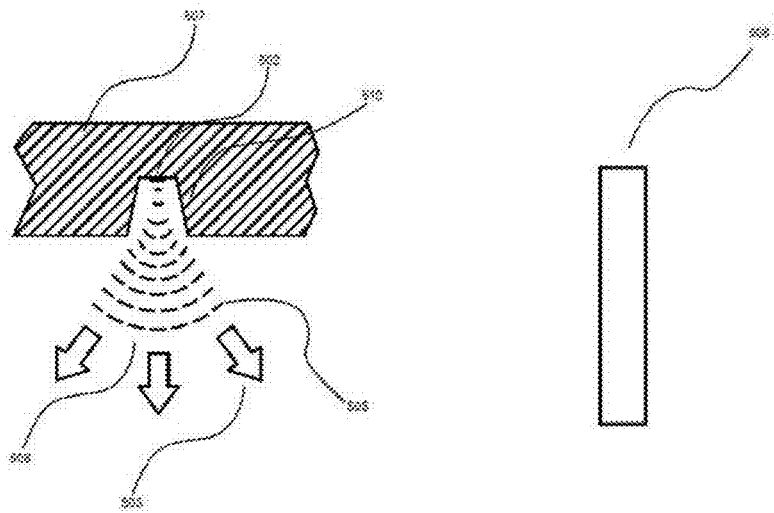
Figure 5C:
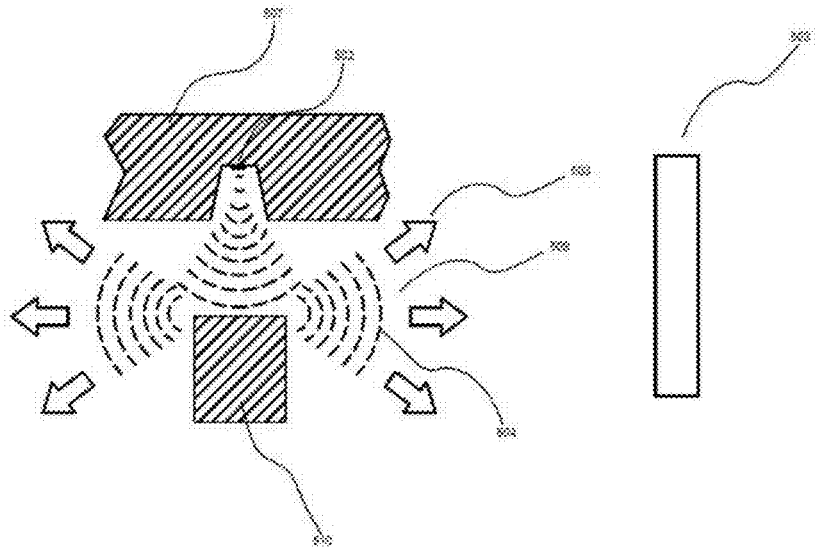

FIGS. 5A-5C illustrate three different antenna-beam radiation patterns. FIG. 5A illustrates the standard beam pattern 501 that results from current state of the art implementation of the antenna 502. FIG. 5B illustrates the directional beam pattern 508 that results when the antenna 502 is recessed and the scattered beam pattern 509 that occurs when the beam 505 is reflected off of an adjacent steel object such as a ground engagement tool ("GET") 510.

In a typical embodiment, a recessed reflector 507 is necessary for the antenna 502 to be protected from wear by abrasion that may occur from, for example, the process of excavation. As illustrated in FIG. 5B, the recession of the reflector 507 alters the beam 505 emitted from the antenna 502 from a hemispherical radiation pattern 501 to a focused beam pattern 508. This is an advantage in cases where the directional beam 508 is oriented in the direction 503 of a repeater 506; however, in some installation requirements, such as with GETs, the beam 505 is emitted orthogonal to the intended radiated signal path. This results in the worst-case beam orientation for signal strength at the repeater 506. As illustrated in FIG. 5C, sub-optimal beam orientation is mitigated by utilizing an adjacent steel object such as the adjacent GET 510 to scatter the focused beam 505 into scattered pattern 509, with the major lobe of the beam 509 oriented toward to the repeater 506. Another embodiment pertains to embedding chip antennas 502 into metallic objects for purposes of protecting the antenna 502 from damage that would otherwise occur if the antennas 502 were mounted on flat surfaces as is done in the current art for chip antennas.

Figure 5D:
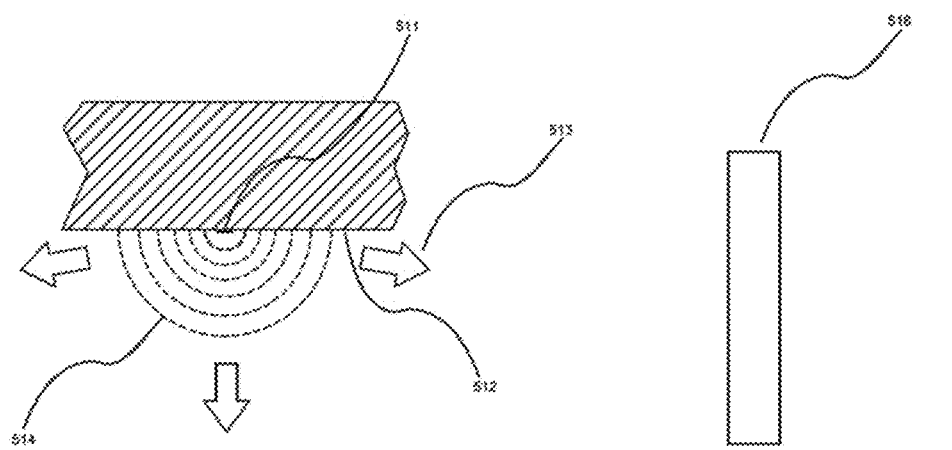
FIGS. 5D-5G are schematic diagrams illustrating embedding arrangements of antennas into metallic objects in accordance with an exemplary embodiment.

FIGS. 5D-5G show a recessed chip antenna 511 reflector variations. FIG. 5D illustrates the standard beam pattern that results from the non-recessed reflector 512 implementation of the antenna 511. The beam radiation pattern 514 radiates in all directions 513 (omnidirectional) in the hemisphere on the antenna side of the reflector 512.

Figure 5E:
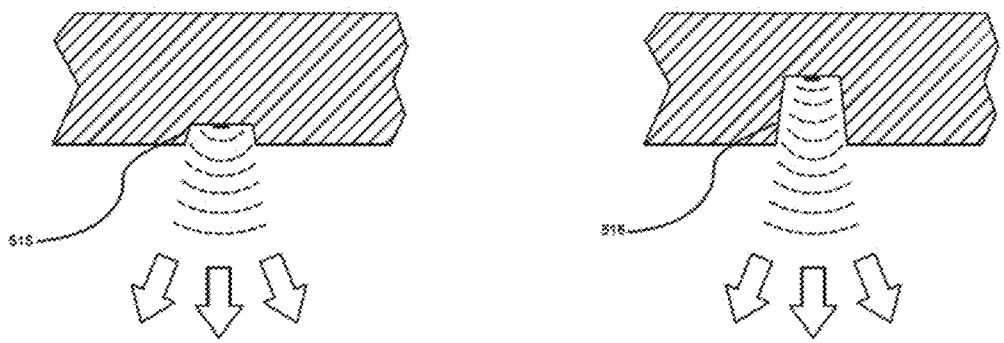
Figure 5F:
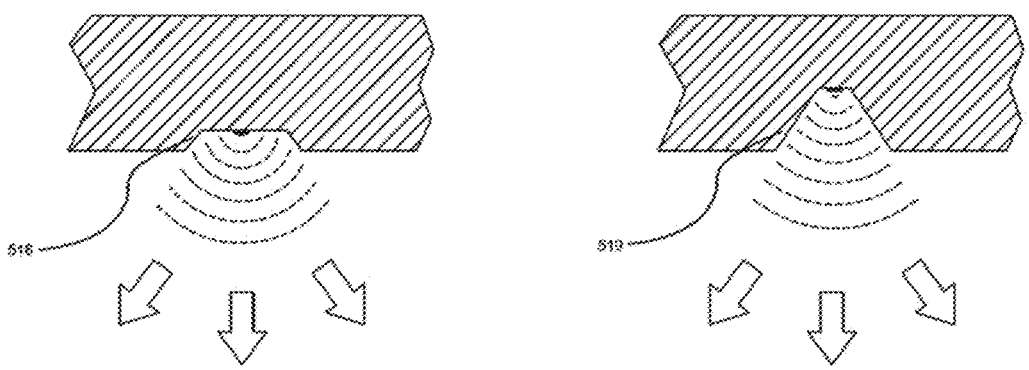
Figure 5G:
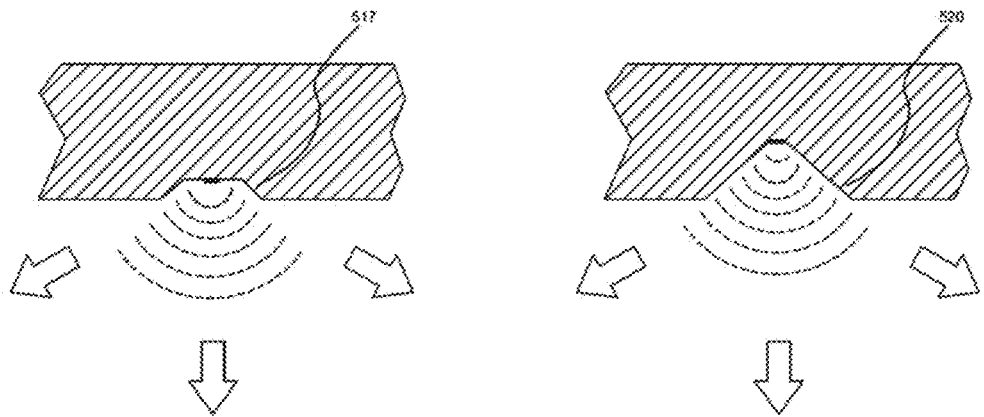

FIGS. 5E-5G portray the variations in directional beam 514 focus that result in changing at least one of the depth and the draft of the recession for the reflector. As the depth of the recession increases from low 515 (FIG. 5E), through medium 516 (FIG. 5F) to high 517 (FIG. 5G), the focus becomes sharper. As the draft changes from a small angle 518 (FIG. 5E), through a medium angle 519 (FIG. 5F) to a large angle 520 (FIG. 5G) the focus changes in the same manner as changes in depth, but it has more impact on the bandwidth of the signal than actual beam pattern 514. The larger the draft angle, the more bandwidth that is achieved. The effects of draft 515, 516, 517 are limited because the chip antennas 511 are designed for operation over a specific passband. In the GET application, the optimal drafts 515, 516, 517 and 518, 519, 520 depths to use are the ones that generate a beam pattern 514 that is slightly larger than the adjacent GET 510 in FIG. 5C. Narrower beam widths will not scatter as well when they reflect off the GET 510. Wider beam widths will lose power in the part of the signal that does not reflect off of the adjacent GET 510. The recessed antenna apertures for this embodiment are small with respect to signal wavelength. Simple aperture shapes such as circles, polygons, ellipses and slots will generally have little effect on the radiation pattern. As the size of these apertures decreases, the signal strength will tend to decrease. Larger apertures will yield more signal strength, but the tradeoff is that as the size increases, so does the vulnerability of the antenna to physical damage.

FIGS. 5D-5G are not intended to be all-inclusive of the variations that are possible when using this embodiment. All shapes, drafts and depths of recessed antenna reflectors could be utilized as dictated by design requirements. Note also, that variations in signal frequencies result in changes to the beam patterns. Variations of the above parameters decrease as the frequency of the signals are increased and are included in this embodiment.

Figure 6:
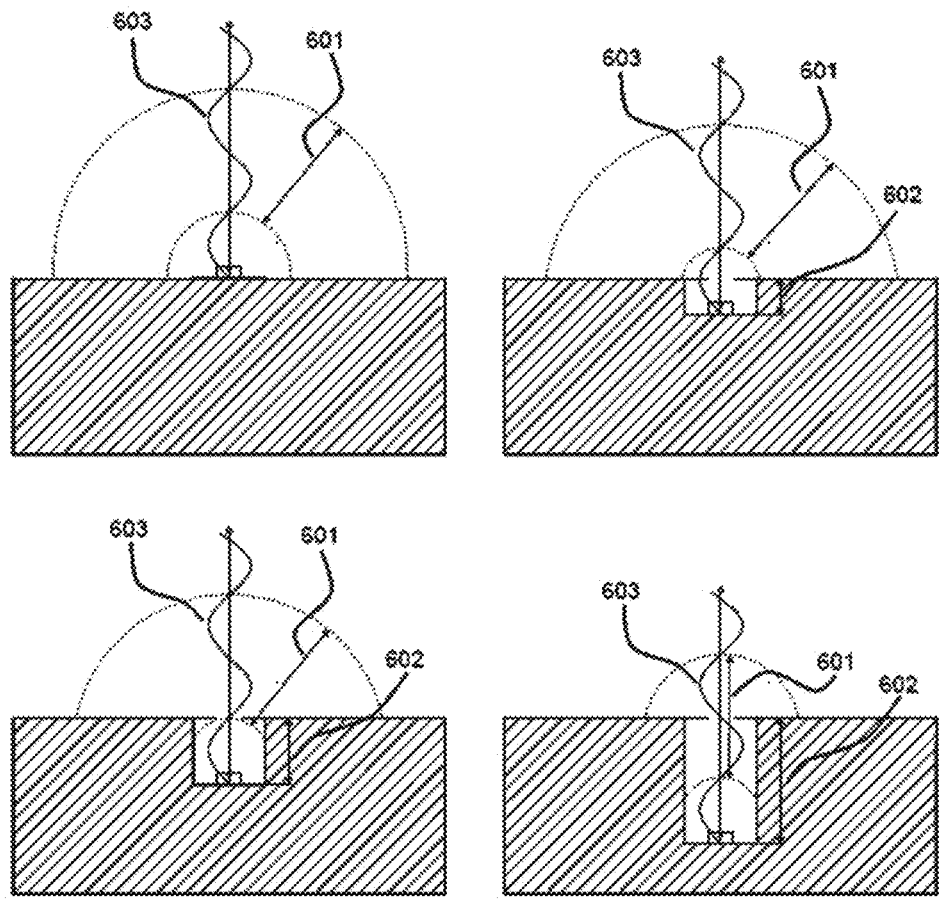
FIG. 6 is a profile view of a surface having different depths of recess to show the relationship between recess depth and radio signal wavelength.

FIG. 6 illustrates the relationship between recess depth 601 and radio signal wavelength 602. The depth of recess 601 becomes significant to signal strength when it is not small compared to the wavelength 602 of the radio signal 603. When the depth of recess 601 is greater than one quarter, or 0.25 times the wavelength 602, the recess begins to significantly attenuate the signal 603, which is omnidirectional in one hemisphere.

Figure 7:
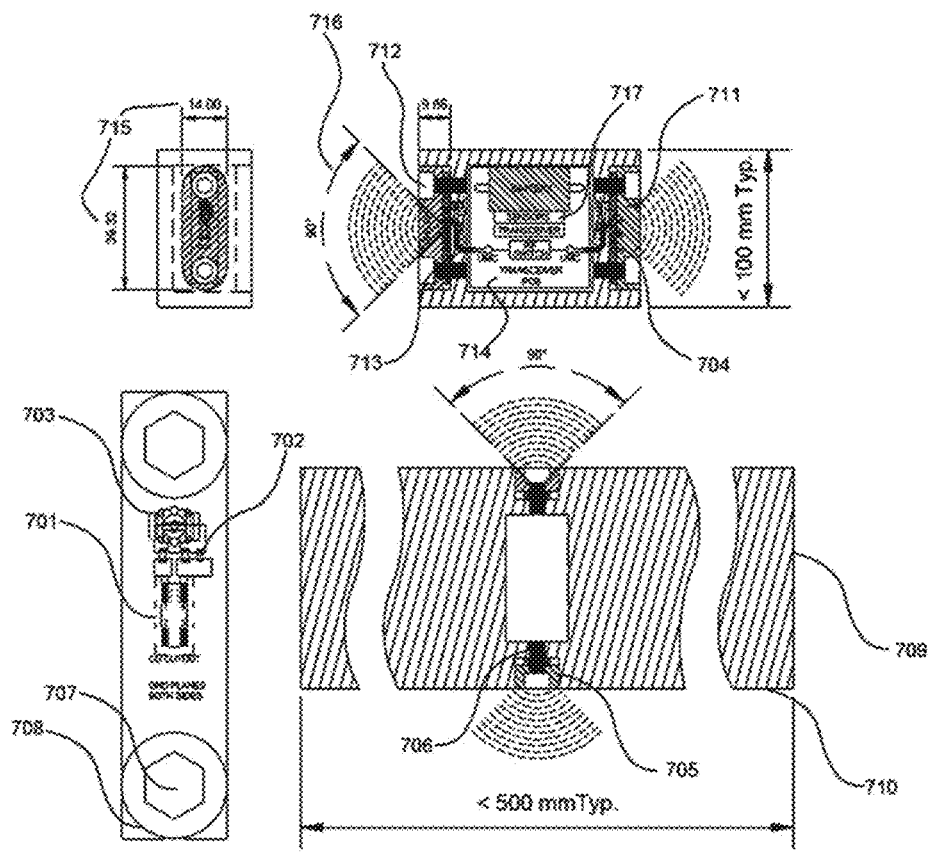
FIG. 7 is a dual-sided embodiment of the remote recessed reflector antenna.

An example embodiment of remote dual antennas with recessed reflectors is shown in FIG. 7. The antenna 701, series and shunt tuning components 702, and cable connector 703 are mounted on a small circuit board 704 that is positioned in the antenna cavity 705 with two mounting holes 707 aligned with threaded screw holes 706 in the bottom of the antenna cavity 705. The bottom sides of the two screw holes 706 in the circuit board 704 have exposed annular rings 708 that are conductively bonded to the steel surface of the bottom of the cavity 705 using an electrically conductive compound. This conductive joint between the grounded PCB 704 annular rings 708 extends the circuit board 704 ground plane into the steel chassis 709. The extended ground plane acts as the reflector for the antenna 701. The current means of mounting these types of antennas is on the edges of flat corner surface reflectors. Mounting the antenna 701 on flat surface corner reflectors is not possible on flat surfaces because the surfaces 710 are exposed to a harsh environment (the antenna 701 would eventually be destroyed). Recessing the antenna 701 into the surface prevents it from being damaged or scraped off the surface on traveled, wear, or aerodynamic surfaces.

The antenna 701 and circuit board 704 is further protected with a cover 711 formed out of a material (such as, for example, PTFE) that fills the cavity 705 in front of the antenna 701 and is attached by means of two screws 712. Connectors 703 are attached to RF cables 713. RF cables 713 carry signals to and from the transceiver and processing circuit board 714 which may contain on-board sensors 717. Dimensions 715 of the cavity 705 allow the radiation pattern 716 to be modified by altering the dimensions 715, when practical. This set of cavity 705 dimensions 715 is specific to this example and may be altered, as required, for similar embodiments. Recessing the antenna 701 and changing the dimensions 715 of the cavity 705 changes the radiation characteristics from an omnidirectional configuration that is characteristic of radiation reflected off of a horn antenna. These changes will make the antenna beam (716) operate in a directional pattern.

Figure 8:
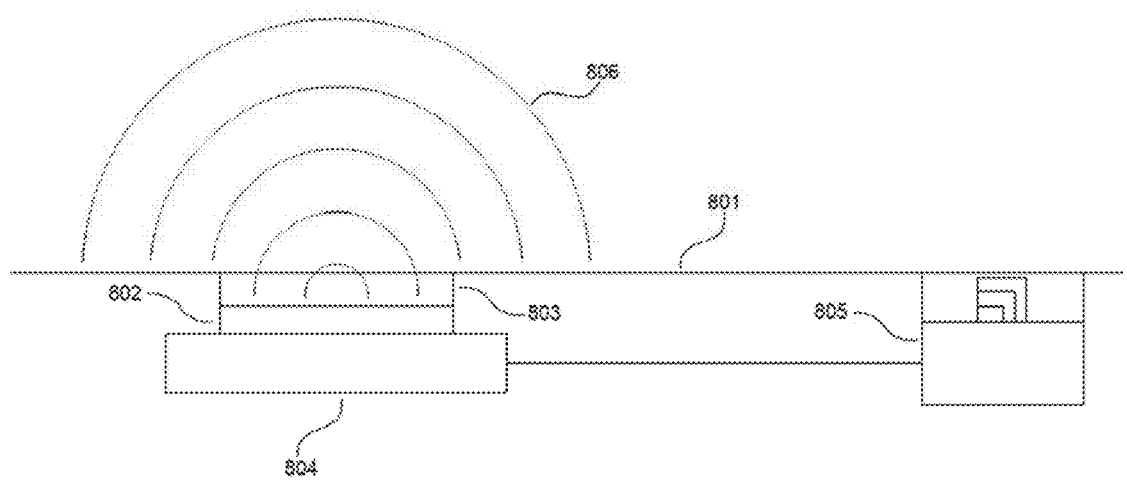
FIG. 8 is a profile view of a surface with remote recessed antenna and ancillary sensors embedded therein.

FIG. 8 is a profile view of a surface with a remote recessed reflector antenna and ancillary sensors embedded therein. The surface of embedment 801 may be an aerodynamic metal surface that includes but is not limited to aircraft, hulls, spacecraft, sky scrapers, automobiles, storage tanks and test chambers. In another embodiment of FIG. 8, the surface of embedment 801 may be a heavily traveled surface that includes but is not limited to roadways, runways, ship decks, and rails. In a further another embodiment of FIG. 8, the surface of embedment 801 may be an unobstructable surface that includes but is not limited to a surface where line-of-site that must be maintained, on firearms and on handheld precision equipment. In yet another embodiment of FIG. 8, the surface of embedment 801 may be wear surface that includes but is not limited to ground engagement tooling, haul truck beds and bed liners, crusher liners, mill liners, shovel buckets and scoops, and heavy equipment track shoes.

Still referring to FIG. 8, the remote recessed reflector antenna 802 is embedded in surface 801 having an aperture 803. The remote recessed reflector antenna 802 is in communication with a processor 804 that may contain on-board sensors. The remote recessed reflector antenna 801 and processor 804 may be in communication with an ancillary sensor or data storage device 805, such as the redundant resistor wear ladder to directly monitor wear (as illustrated, for example, in FIGS. 9 and 10) or a third-party sensor package that is used to indirectly infer wear. The remote recessed reflector antenna 802 may transmit and receive information including environmental, mechanical, acoustic, positional, and wear information. A plurality of remote recessed reflector antenna units 802 may be in communication with one another via mesh network. The plurality of remote recessed reflector antenna units may further be in communication with higher-level network topology, the information ultimately being displayed at a user interface.

Figure 9:
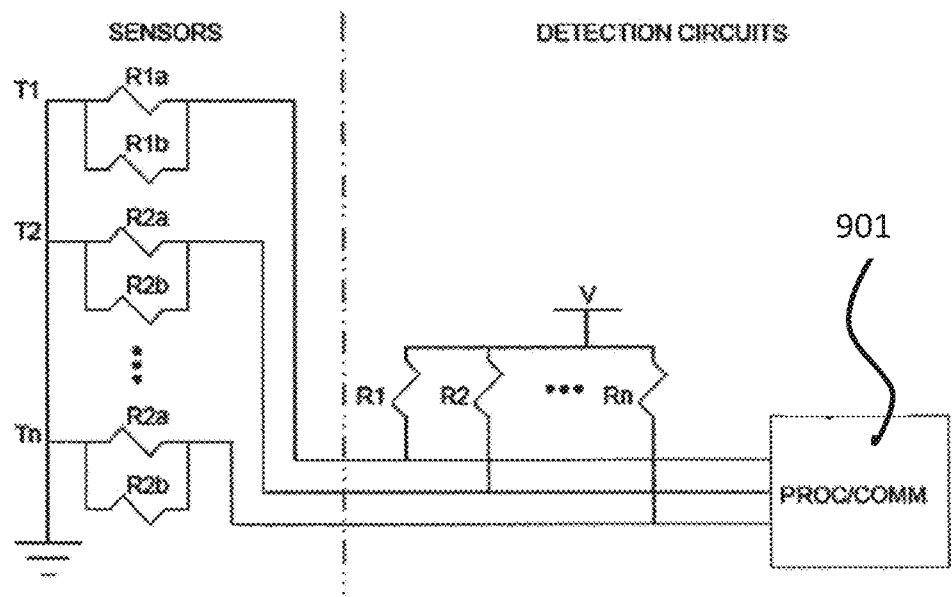
FIG. 9 a circuit diagram for a wear detector in accordance with an exemplary embodiment.

FIG. 9 is a circuit diagram of a wear detector according to an exemplary embodiment. Although embodiments are not limited to a specific type of transducer, the use of resistor pairs (redundant resistors) for monitoring is discussed herein as an example. A first resistor pair T1, having resistors R1*a* and R1*b*, is embedded nearest the outer wear surface with a second resistor pair T2, having resistors R2*a* and R2*b*, through resistor pair Tn equally spaced along the wear path. The resistor pair Tn is located closest to the wear limit. When a new surface, such as, for example, a GET, wears down to a resistor pair, such as R1*a* and R1*b*, a combinatorial resistance changes. The resistance can be reduced or shorted (if filled with mud) or increased or open (if the connections or resistor are damaged or broken). The change in resistance indicates to a processing device 901 that a wear depth corresponding to a particular resistor pair has been reached. Although not shown in FIG. 9, circuit traces may also be made redundant by use of more traces and circuit board layers to decrease the probability of false indications due to faulty trace failures.

Redundant transducers and traces improve the monitoring reliability of the wear detector. Single component, connection or trace failures resulting from defects in manufacturing, extremes in temperature, shock or vibration of the operating environment are detected and compensated for in the processing circuitry of the processing device 901. For example, if the parallel combination of the resistors R1*a* and R1*b* equals the value of the resistor R1, then the analog voltage detected at the processing device 901 is V/2. If a failure of the resistor R1*a*, the resistor Rib, or a connection or trace path to either of these resistors results, due to a manufacturing fault, temperature extremes, or from shock or vibration, one of the resistors R1*a* or R1*b* will be omitted from the circuit. Omission of one of the resistors R1*a* or R1*b* will result in the resistance of the resistor R1 being ½ the resistance of the remaining connected resistor (R1*a* or Rib). The voltage detected at the processing device 901 will then be V/3. This voltage level will indicate to the processing device 901 that the failure may not be related to wear. If the voltage level is due to wear, it will not make a difference as the other resistor R1*a* or R1*b* will soon be removed by wear. Until both the resistors R1*a* and R1*b* in the pair are faulted, the wear-point will not be considered, by the processing device 901, to have been reached. In wear detectors that do not have redundancy, failures in any of the traces or transducer will incorrectly indicate that a wear point was reached. This is an example of direct wear monitoring.

Figure 10:
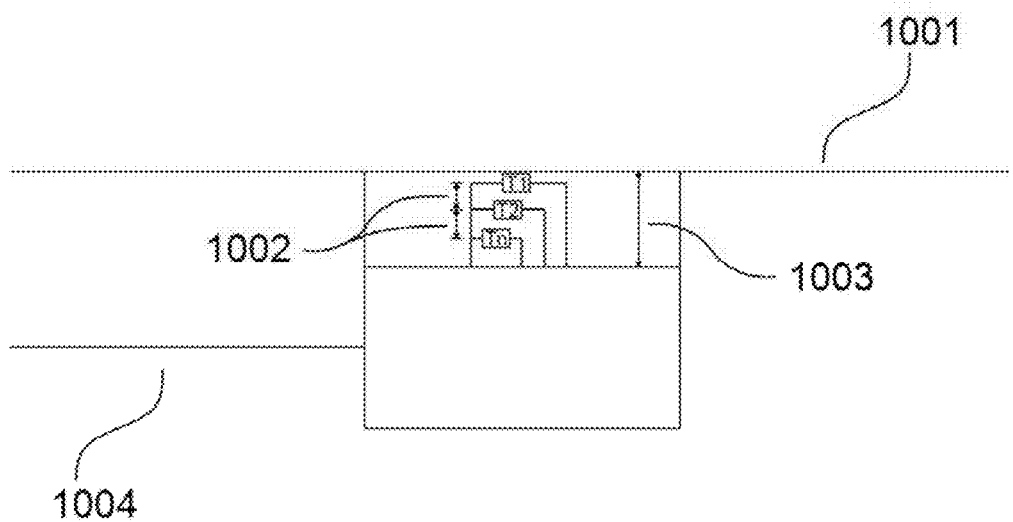
FIG. 10 is a schematic diagram of the wear detector of FIG. 9 showing a spacing of resistors along a wear path in accordance with an exemplary embodiment.

FIG. 10 is a schematic diagram of an exemplary embodiment of a wear detector in FIG. 9 embedded in a wear surface 1001 and showing a spacing 1002 of transducers T1-Tn along a wear path 1003 in accordance with an exemplary embodiment. The wear detector is in communication 1004 with a processing and transmitting device. The wear surface 1001 may be but is not limited to any of the following; crusher liners, haul truck beds and bed liners, ground engagement tooling, shovel buckets and scoops, and heavy equipment track shoes.

An exemplary embodiment of the present invention relates to methods and systems for improved tool-wear measurement and detection. More particularly, but not by way of limitation, said exemplary embodiment of the present invention relates to wear sensors that enable tools with wear surfaces such as, for example, ground engaging tools (GETs) to report wear status or breakage over a life cycle of the tool.

In the present application, various embodiments of a wear sensor are shown as applied to a GET. However, embodiments of the wear sensor of the present invention may be used in any tool or equipment that has wear surfaces and that may benefit from wear monitoring, including wear monitoring of wear surfaces, for example: teeth, tooth adapters, rippers, cutting edges, edge protection, and blades. Such devices may be used on any heavy earthmoving machines that use a GET, for example: shovels, dozers, loaders, trenchers, draglines, excavators, rippers, scrapers, graders, dredgers, or any other type of earthmoving equipment.

Various embodiments of the present invention will now be described more fully with reference to the accompanying drawings. The invention may, however, be embodied in many different forms and should not be construed as limited to the embodiments set forth herein.

Figure 11A:
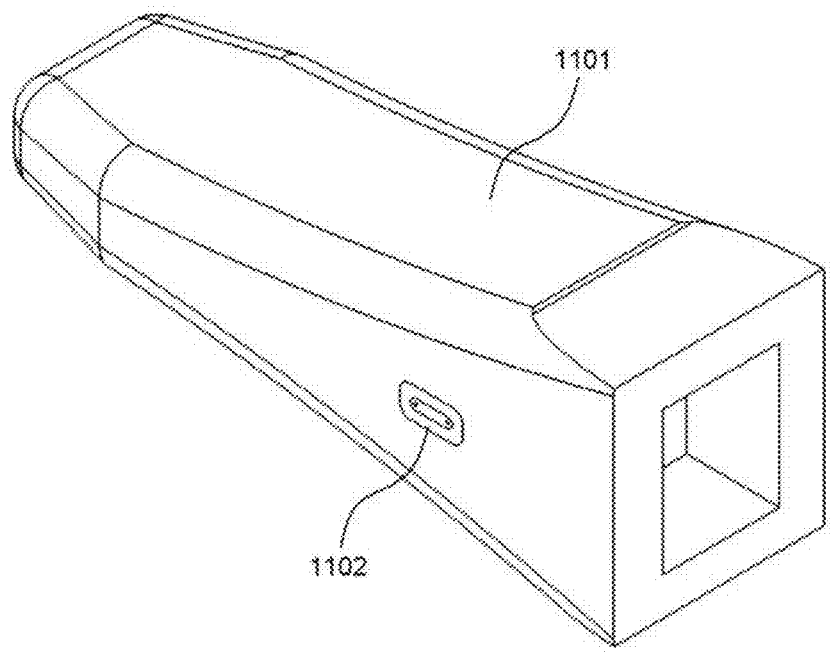
FIG. 11A is a perspective view of a ground engaging tool (GET) having a Remote Recessed Reflector Antenna embedded therein.
Figure 11B:
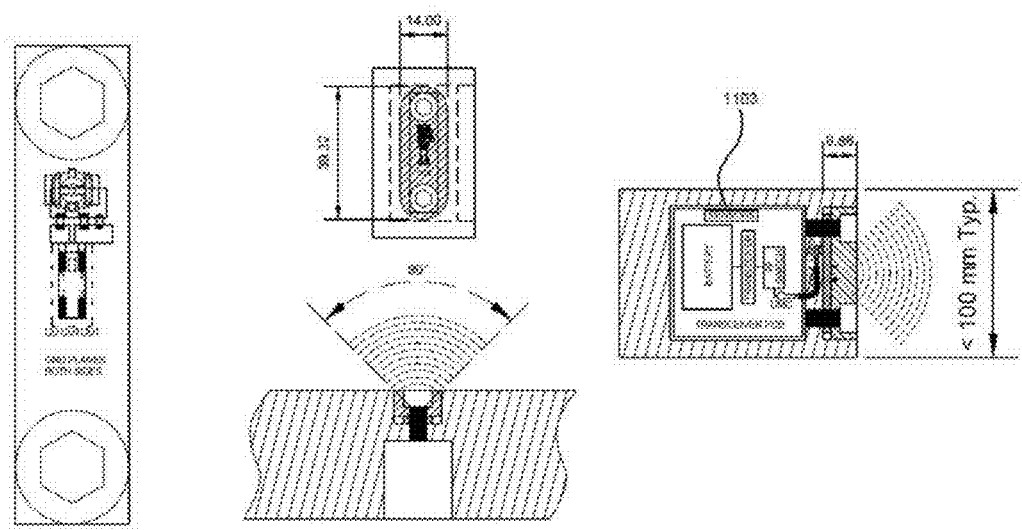
FIG. 11B is a single-sided embodiment of the remote recessed reflector antenna in FIG. 7.

FIG. 11A is a perspective view of a GET 1101 having a wear module 1102 embedded therein. FIG. 11B is an embodiment of the remote antenna with recessed reflector 1102 wherein that may contain sensors 1103 that collect motion-related information from which wear may be inferred. By way of example, the sensors may communicate information from accelerometers and gyros to a processor that infers the number of scooping motions the GET has experienced, or if the GET is broken or disconnected from its host. The number of scooping motions will be indicative of the amount of wear on the GET while information from accelerometers will infer breakage or loss.

Figure 12A:
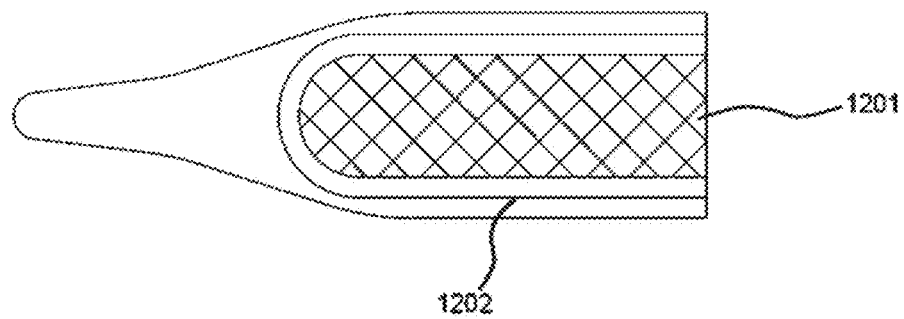
FIG. 12A is a cross-sectional plan view of the GET of FIG. 11A showing exemplary wear out limits.

FIG. 12A is a cross-sectional view of a GET 1101. In a typical embodiment, a GET has a means 1201 to adapt to host equipment such as, for example, the earthmoving equipment discussed above. The GET 1101 has a life-cycle that starts when the GET 1101 is installed and ends when wear-out limits 1202 of the GET 1101 are reached. If the GET 1101 is worn beyond the wear-out limits 1202, the host equipment may be damaged. Accelerometers and gyros may be embedded in the GET 1101 to serve as means of indirectly monitoring wear, as opposed to or in conjunction with a direct wear monitoring system, such as a wear ladder. Said accelerometers and gyros are able to gather information about the acceleration and orientation of the GET 1101. This information may be used to characterize the amount of time the GET 1101 has been actively engaged with the ground. This amount of time may be compared to known wear rates to infer the amount of wear on the GET 1101.

Figure 12B:
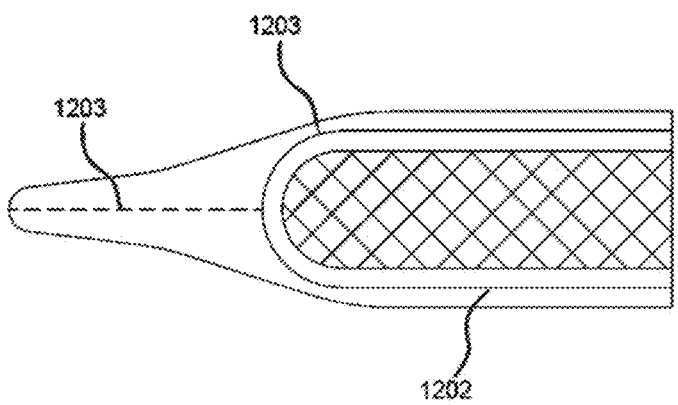
FIG. 12B is a cross-sectional plan view of the GET of FIG. 11A showing exemplary wear paths.

FIG. 12B is a cross-sectional plan view of the GET 1101 showing exemplary wear paths. For purposes of this document, a wear-path is defined as a path from the surface of a new GET 1101 to the wear-out limit 1202 that is to be monitored. FIG. 12B shows generic examples of wear paths 1203; however, in various embodiments, any wear path could be defined through the GET 1101. The first step in wear monitoring is to define the wear paths on the GET 1101 that are to be monitored. Because each tool has unique wear characteristics, the wear paths that are monitored will differ in both location and wear depth. The wear rate at different points on, for example, the GET 1101 will vary based on engagement of the GET with the materials being moved. For example, a small GET may only require one wear path to be monitored while larger GETs may require multiple wear paths to be monitored. Wear depth (distance from new surface to wear-out limit 1202) monitoring is accomplished for each wear-path by embedding transducers at intervals along the wear path. As the GET surface wear reaches a transducer, electrical characteristics of the transducer are altered. In a typical embodiment, any type of transducer may be used to detect wear on the GET 1101. The use of resistors as transducers is discussed herein as an example.

Figure 13:
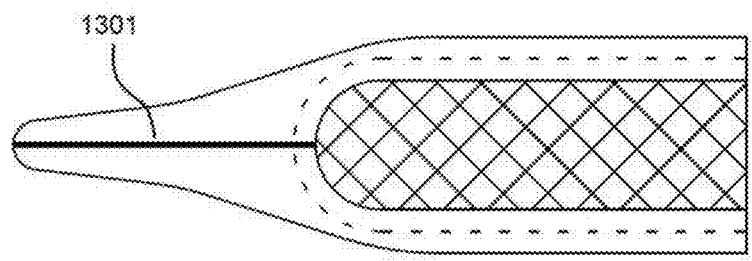
FIG. 13 is an enlarged plan view of the GET of FIGS. 12A and 12B showing a wear detector embedded therein in accordance with an exemplary embodiment.
Figure 14:
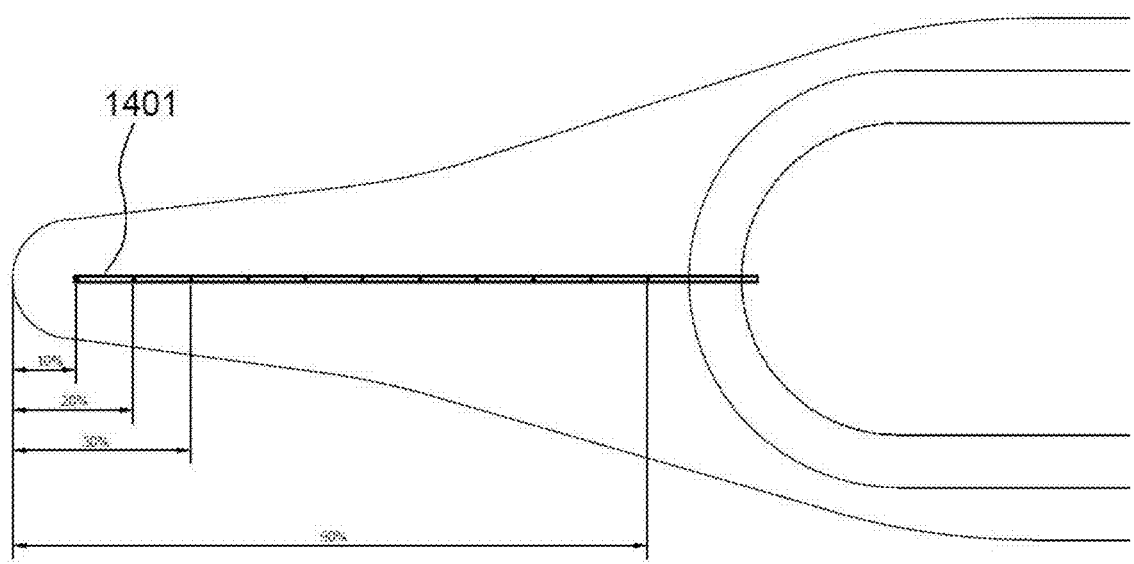
FIG. 14 is a schematic diagram of the wear detector of FIG. 13 showing a spacing of resistors along a wear path in accordance with an exemplary embodiment.
Figure 15:
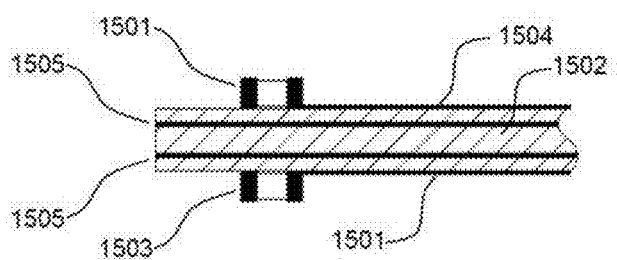
FIG. 15 is an enlarged detailed view of the wear detector of FIG. 14 showing a pair of resistors in accordance with an exemplary embodiment.

FIG. 13 is an enlarged plan view of the GET 1101 of FIGS. 12A and 12B showing a sensor 1301 embedded therein. FIG. 14 is a schematic diagram of a sensor 1301 showing the spacing of resistors along a wear path 1203. FIG. 15 is an enlarged detail view of the GET 1101 showing placement of the resistor pairs. The physical implementation of the sensor 1301 may be accomplished by inserting it into a small hole located along the wear path, as shown here for wear path 1203. The voids around the sensor 1301 may be filled with a compound, such as epoxy, to protect the sensor 1301 from damage due to shock or vibration. FIG. 14 shows the spacing of the individual resistor pairs, in wear path 1203, which are broken away when the wear level reaches them. As illustrated in FIG. 14, the resistors are spaced at intervals that will indicate wear in increments of 10%.

FIG. 15 shows details of one redundant resistor pair. One resistor 1501 is located on a top surface of circuit board 1502, the other resistor 1503 is located on the bottom side. Traces that carry sensor signals are on the top 1504 middle 1505 and bottom 1506 layers of the circuit board 1502. Putting traces on multiple circuit-board layers reduces a width of the circuit board 1502 to fit in a smaller hole in the GET 1101. Note that the example above is for redundancy using a pair of resistors.

From the perspective of monitoring the wear of a GET such as, for example, the GET 1101, since there are no practical means of attaching wires for communication, the application is considered to be remote. For the GET, monitoring electronics inside the GET 1101 are to be powered by a battery. The battery is to be specified to operate the monitoring circuits for the lifetime of the GET 1101. When the GET is installed on the host equipment, the battery is connected. The battery remains connected for the life of the GET 1101.

Transmission of data from the GET 1101 is accomplished by use of recessed antennas mounted in the surfaces of the GET 1101 which are least exposed to abrasion. The antenna may be encapsulated or otherwise covered with materials that will best withstand the abrasion. PTFE (Polytetrafluoroethylene, also known as Teflon) is an example of one material that may be well suited to this application for the following reasons: it has low surface friction; it is rigid; and it does not significantly attenuate radio frequency transmissions. Small gaps around covers made of materials, such as PTFE, may be sealed from moisture using epoxy or other suitable sealants. The size of the aperture used for wireless transmission must be minimized to best protect the antenna and associated circuits. One or more antennas may be implemented for this application, based on the need to radiate and receive signals in multiple directions.

Figure 16:
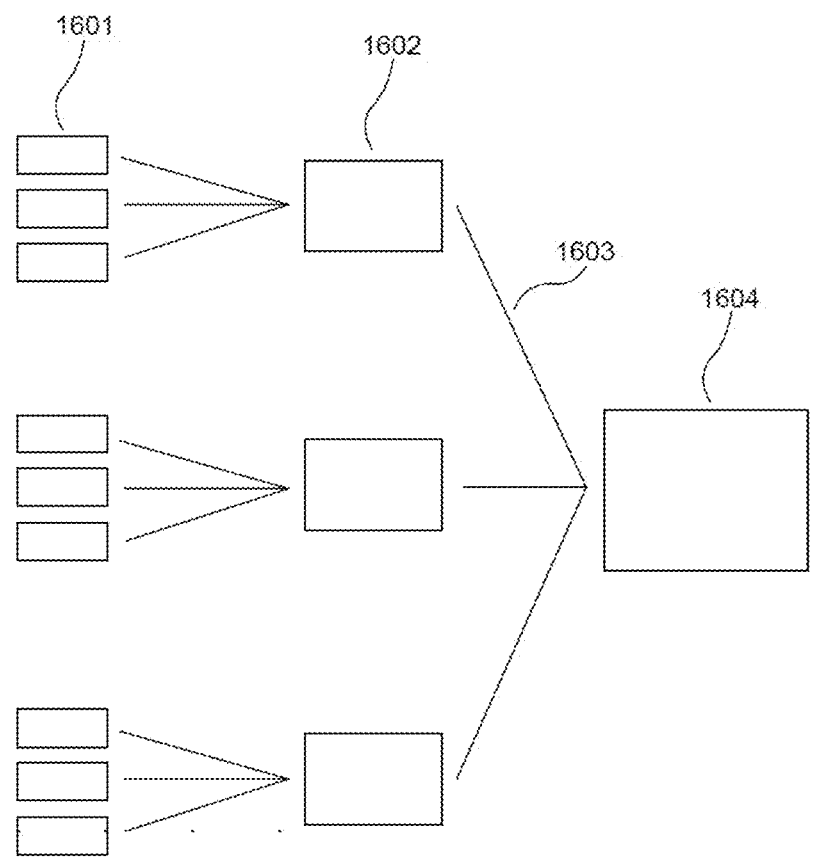
FIG. 16 is a network diagram illustrating a network topology for a wireless network.

FIG. 16 shows basic network topology for a wireless networks. In the topology, end nodes 1601 transmit signals 1603 to and receive signals 1603 from repeaters 1602; and, repeaters 1602 transmit signals 1603 to and receive signals 1603 from the director 1604. In a typical embodiment, directors 1604 control the signal 1603 paths between all of the devices in the network. Repeaters 1602 receive signals 1603 from devices and replicate them to other devices; and end nodes 1601 send to and receive signals 1603 from repeaters 1602 or directors 1604.

Figure 17A:
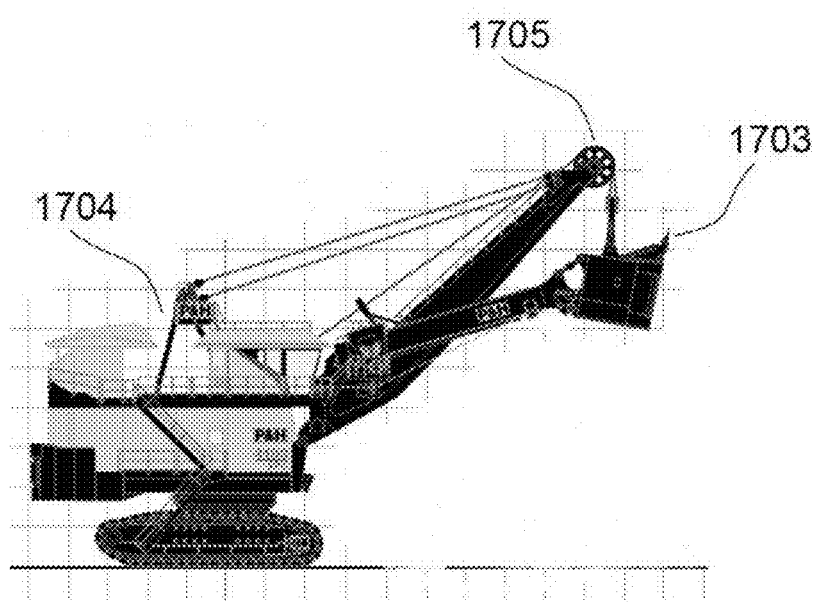
FIGS. 17A and 17B are schematic diagrams illustrating an implementation of the wireless network of FIG. 16 to detect a lost GET according to an exemplary embodiment.
Figure 17B:
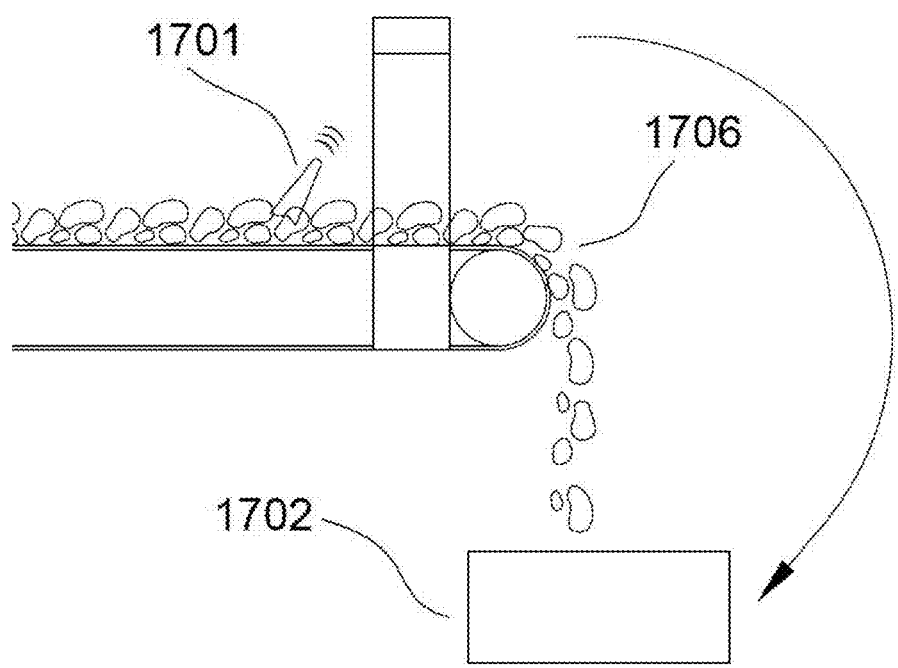

FIGS. 17A and 17B show the implementation of the network that is used to detect lost GETs 1701 and locate them before they damage equipment such as crushers 1702. For purposes of clarity, FIGS. 17A and 17B are described herein relative to FIG. 16. The GETs form the teeth on the scooping edge 1703 of the shovel 1704. Each GET 1701 has a built-in electronics circuit card with sensors which may or may not be connected to an imbedded redundant resistor wear sensor and recessed reflector antenna assembly that acts as an end node 1601 in the network topology shown in FIG. 16. Each of the GETs 1701 on the scooping edge communicates with one or more repeaters 1602 on, or in the vicinity of, the shovel 1704. One likely location for the repeaters 1602 in on the end of the shovel boom 1705. The director 1604 may be located inside or around the operator cab of the shovel 1704 or anywhere in the vicinity or the machine.

An exemplary embodiment consists of implementing the network hardware as a means of detecting and re-locating lost GETs 1701 that break away from the shovel scoop edge 1703 and are lost in the ore 1706 materials. Lost GETs 1701 may pose a substantial risk to the crushers 1702 that are used to process the ore 1706. In normal operation, the end nodes 1601 inside the GETs 1701 communicate through the repeaters 1602 that are closest to the shovel 1704. If the GETs 1701 break away and are loaded with ore 1706 into transport equipment, they move away from the repeaters 1602. As they move away, their signal 1603 strengths at the repeaters 1602 decrease until the signal 1603 is entirely lost. If the signal 1603 from a GET 1701 decreases, with respect to the signals 1603 from the other GETs 1701, the network application detects this as a lost GET 1701. If the detached GET 1701 comes into range of the repeaters 1602 and directors 1604 on the ore 1706 transport mechanisms or on the crusher 1702, the applications on these detect that lost GET 1701 and give an approximate location. The lost GET 1701 may then be located using hand-held repeaters to isolate the exact position of the lost GET 1701.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A recessed antenna comprising:
   a recession formed in a conductive surface, the recession comprising a recessed plane and at least two walls that are substantially perpendicular to the recessed plane;
   an antenna disposed on the recessed plane such that the conductive surface acts as a reflective ground surface to transmit a signal from the antenna in an omnidirectional fashion in at least a hemisphere;
   a cavity formed beneath the recessed plane;
   a circuit board disposed in the cavity, the circuit board being electrically coupled to the antenna; and
   a cover disposed over the antenna, the cover protecting the antenna from abrasion.

2. The recessed antenna of claim 1, wherein the conductive surface is a ground engagement tool.

3. The recessed antenna of claim 1, wherein the cover comprises polytetrafluoroethylene.

4. The recessed antenna of claim 1, comprising a wireline conduit formed in the recessed plane.

5. The recessed antenna of claim 4, wherein the wireline conduit is coupled to the cavity.

6. A recessed antenna comprising:
   a recession formed in a conductive surface, the recession comprising a recessed plane and at least two walls that are substantially perpendicular to the recessed plane;
   an antenna disposed on the recessed plane such that the conductive surface acts as a reflective ground surface to transmit a signal from the antenna in an omnidirectional fashion in at least a hemisphere;
   a cavity formed beneath the recessed plane;
   a circuit board disposed in the cavity, the circuit board being electrically coupled to the antenna;
   a cover disposed over the antenna, the cover protecting the antenna from abrasion; and
   wherein the depth of the recessed plane is less than one quarter of a wavelength transmitted by the antenna.

7. The recessed antenna of claim 6, wherein the conductive surface is a ground engagement tool.

8. The recessed antenna of claim 6, wherein the cover comprises polytetrafluoroethylene.

9. The recessed antenna of claim 6, comprising a wireline conduit formed in the recessed plane.

10. The recessed antenna of claim 9, wherein the wireline conduit is coupled to the cavity.

* * * * *

UNITED STATES PATENT AND TRADEMARK OFFICE
CERTIFICATE OF CORRECTION

PATENT NO. : 11,296,419 B1
APPLICATION NO. : 15/496747
DATED : April 5, 2022
INVENTOR(S) : Randy Richardson et al.

It is certified that error appears in the above-identified patent and that said Letters Patent is hereby corrected as shown below:

In the Specification

Column 7, Line 16  Replace "the resistor R1b" with
-- the resistor $R1b$ --

Column 7, Line 22  Replace "($R1a$ or R1b)" with
-- ($R1a$ or $R1b$) --

Signed and Sealed this
Nineteenth Day of July, 2022

Katherine Kelly Vidal
*Director of the United States Patent and Trademark Office*